US009473301B2

(12) United States Patent
Englund et al.

(10) Patent No.: US 9,473,301 B2
(45) Date of Patent: Oct. 18, 2016

(54) SYSTEMS AND METHODS FOR TELECOMMUNICATION USING HIGH-DIMENSIONAL TEMPORAL QUANTUM KEY DISTRIBUTION

(71) Applicant: The Trustees Of Columbia University In The City Of New York, New York, NY (US)

(72) Inventors: Dirk R. Englund, New York, NY (US); Pierre Desjardins, New York, NY (US); Jacob Mower, New York, NY (US)

(73) Assignee: The Trustees Of Columbia University In The City of New York, New York, NY (US)

( * ) Notice: Subject to any disclaimer, the term of this patent is extended or adjusted under 35 U.S.C. 154(b) by 261 days.

(21) Appl. No.: 14/338,034

(22) Filed: Jul. 22, 2014

(65) Prior Publication Data

US 2016/0234017 A1    Aug. 11, 2016

Related U.S. Application Data

(63) Continuation of application No. PCT/US2013/021923, filed on Jan. 17, 2013.

(60) Provisional application No. 61/589,610, filed on Jan. 23, 2012, provisional application No. 61/673,374, filed on Jul. 19, 2012, provisional application No. 61/714,951, filed on Oct. 17, 2012.

(51) Int. Cl.
*H04L 9/08* (2006.01)
*H04B 10/079* (2013.01)
(Continued)

(52) U.S. Cl.
CPC ......... *H04L 9/0852* (2013.01); *H04B 10/0795* (2013.01); *H04B 10/25* (2013.01); *H04B 10/70* (2013.01)

(58) Field of Classification Search
CPC . H04L 9/0852; H04B 10/0795; H04B 10/25; H04B 10/70
See application file for complete search history.

(56) References Cited

U.S. PATENT DOCUMENTS 5,745,613 A    4/1998    Fukuchi et al.
5,825,949 A    10/1998   Choy et al.
(Continued)

FOREIGN PATENT DOCUMENTS

WO    WO 2004/073228    8/2004

OTHER PUBLICATIONS

U.S. Appl. No. 14/252,110, filed Apr. 14, 2014.
International Search Report and Written Opinion for PCT/US12/046385, dated Sep. 18, 2012.
International Search Report and Written Opinion for PCT/US12/060565, dated Jun. 25, 2013.
(Continued)

*Primary Examiner* — Daniel Petkovsek
(74) *Attorney, Agent, or Firm* — Baker Botts L.L.P.

(57) ABSTRACT

Techniques for temporal quantum key distribution between at least a first entity and a second entity include measuring an arrival time of each of a plurality of photons within each of a set of time frames. The arrival time can correspond to one of the plurality of time bins within the time frame. Measuring can occur in a randomly selected one of at least two mutually unbiased bases. The mutually unbiased bases can include a basis corresponding to a measurement with dispersion and a basis corresponding to a measurement without dispersion. The randomly selected basis for each time frame can be communicated, via a classical communications channel. A quantum key can be generated from the time bins corresponding to the arrival time of photons within at least some of the time frames for which the randomly selected basis is consistent between the first and the second entity.

24 Claims, 9 Drawing Sheets

(51) Int. Cl.
*H04B 10/70* (2013.01)
*H04B 10/25* (2013.01)

(56) References Cited

U.S. PATENT DOCUMENTS

| | | | |
|---|---|---|---|
| 6,718,093 B2 | 4/2004 | Zhou | |
| 6,895,092 B2* | 5/2005 | Tomita | H04L 9/0662 380/256 |
| 7,162,124 B1 | 1/2007 | Gunn, III et al. | |
| 7,253,871 B2 | 8/2007 | Lukishova et al. | |
| 7,303,339 B2 | 12/2007 | Zhou et al. | |
| 7,346,166 B2 | 3/2008 | Inoue et al. | |
| 7,359,514 B2 | 4/2008 | Trifonov et al. | |
| 7,570,365 B2 | 8/2009 | Trifonov et al. | |
| 7,634,710 B2 | 12/2009 | Dabiri et al. | |
| 7,831,048 B2 | 11/2010 | Kastella et al. | |
| 7,877,012 B2 | 1/2011 | Shapiro et al. | |
| 8,744,086 B2* | 6/2014 | Englund | H04L 9/0852 380/278 |
| 9,143,266 B2* | 9/2015 | Mower | H04B 10/70 |
| 2002/0110328 A1 | 8/2002 | Bischel et al. | |
| 2003/0169880 A1 | 9/2003 | Nambu et al. | |
| 2004/0264905 A1 | 12/2004 | Blauvelt et al. | |
| 2007/0076871 A1 | 4/2007 | Renes | |
| 2007/0093702 A1 | 4/2007 | Yu et al. | |
| 2008/0037998 A1 | 2/2008 | Zhengfu et al. | |
| 2008/0050126 A1 | 2/2008 | Shapiro et al. | |
| 2009/0175450 A1 | 7/2009 | Brandt | |
| 2009/0180776 A1 | 7/2009 | Brodsky et al. | |
| 2009/0304326 A1 | 12/2009 | Blauvelt et al. | |
| 2010/0079833 A1 | 4/2010 | Langford et al. | |
| 2011/0002578 A1 | 1/2011 | Nakada et al. | |
| 2011/0013266 A1 | 1/2011 | Preble et al. | |
| 2012/0077680 A1 | 3/2012 | Berggren et al. | |
| 2012/0146646 A1 | 6/2012 | Manipatruni et al. | |
| 2014/0153926 A1 | 6/2014 | Englund et al. | |

OTHER PUBLICATIONS

International Search Report and Written Opinion for PCT/US12/021923, dated Apr. 5, 2013.

International Search Report and Written Opinion for PCT/US13/059621, dated May 27, 2014.

Ali-Khan et al., "Large-Alphabet Quantum Key Distribution Using Energy-Time Entangled Bipartite States", Physical Review Letters, 98:060503 (4 pages) (2007).

Dauler et al., "Multi-Element Superconducting Nanowire Single-Photon Detector", IEEE Transaction on applied Superconductivity, 17(2):279-284 (2007).

Herder, "Designing and Implementing a Readout Strategy for Superconducting Single Photon Detectors", Massachusetts Institute of Technology, 112 pages (2010).

Levine et al., "Heralded, Pure-State single-Photon Source Based on a Potassium Titanyl Phosphate Waveguide", Optic Express, 18(4):3708-3718 (2010).

Mower et al., "Dense Wavelength Division Multiplexed Quantum Key Distribution Using Entangled Photons", Cornell University Library, (9 pages) (2011).

Ortlepp et al., "Demonstration of Digital Readout Circuit for Superconducting Nanowire Single Photon Detector", Otics Express, 19(19):18593-18601 (2011).

Roelkens et al., "Grating-Based Optical Fiber Interfaces for Silicon-on-Insulator Photonic Integrated Circuits", IEEE Journal of Selected Topics in Quantum Electronics, 17(3):571-580 (2011).

Sun et al., "Cantilever Couplers for Intra-Chip Coupling to Silicon Photonic Integrated Circuits", Optics Express, 17(6):4564-4574 (2009).

Xiong et al., "Slow-Light Enhanced Correlated Photon-Pair Generation in Silicon", Cornell University Library, p. 3413 (3 pages) (submitted Jun. 17, 2011).

U.S. Appl. No. 14/149,531, Jan. 2, 2015.

* cited by examiner

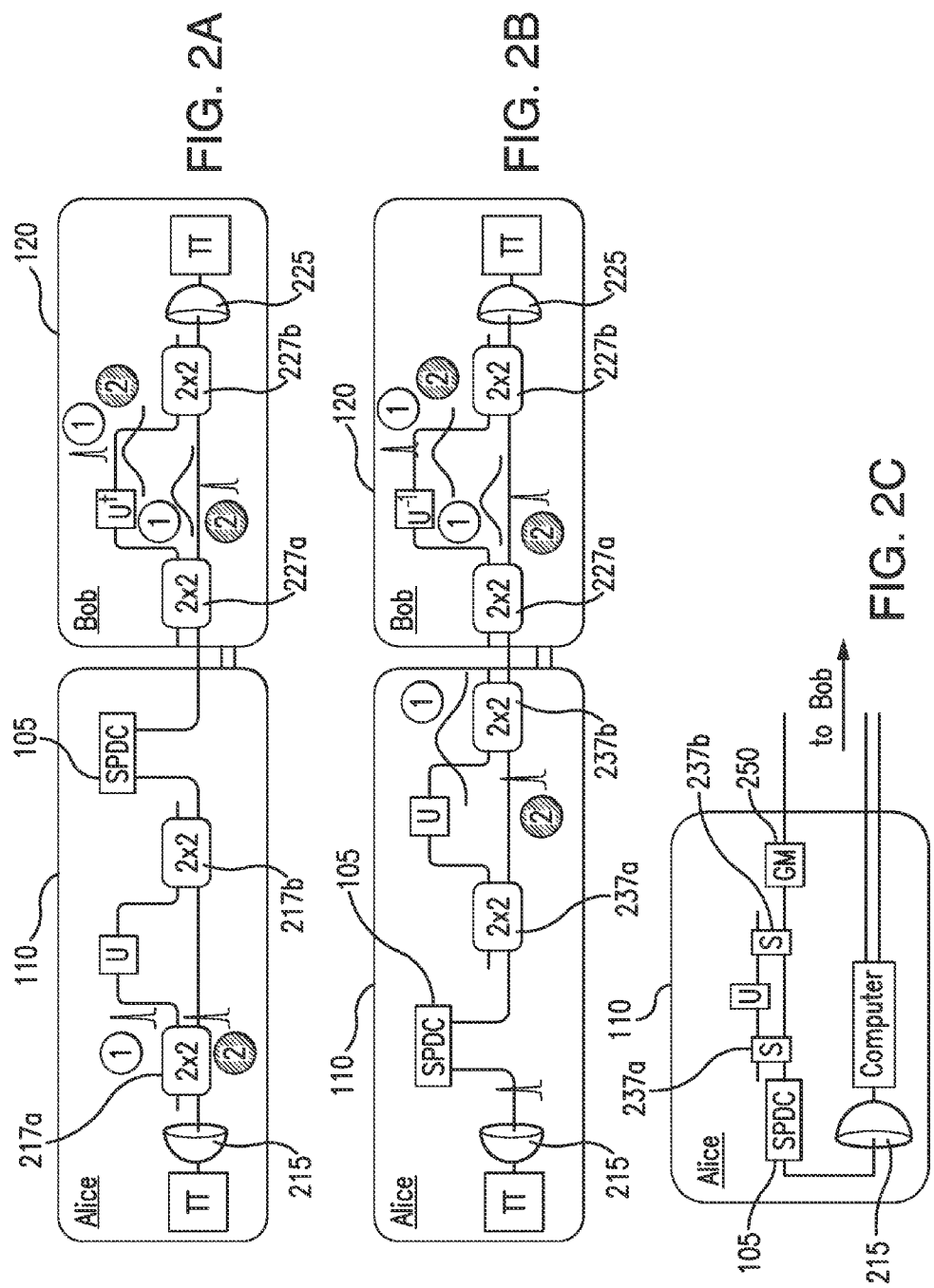

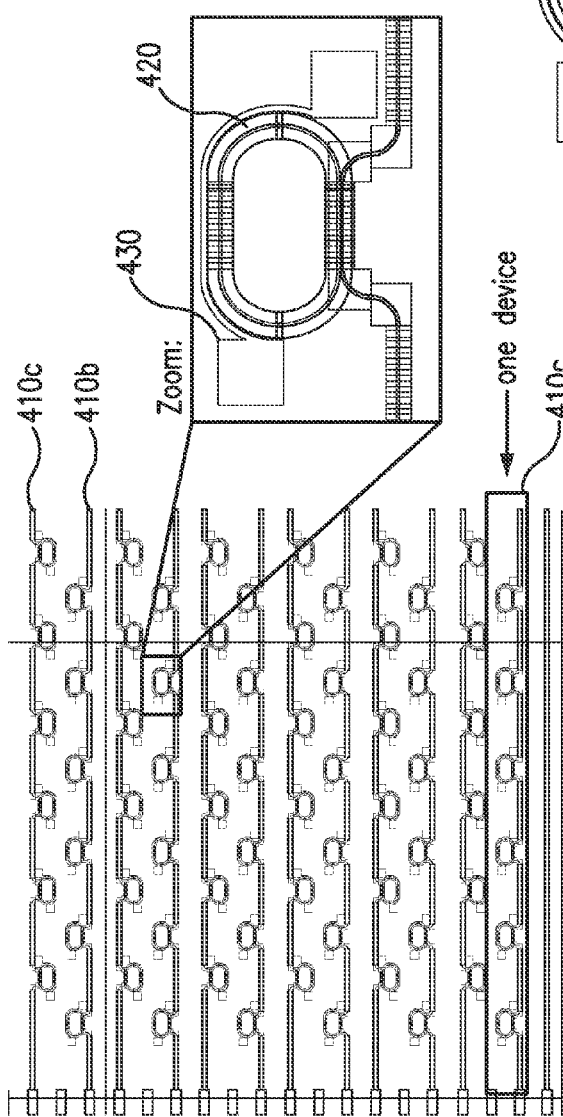
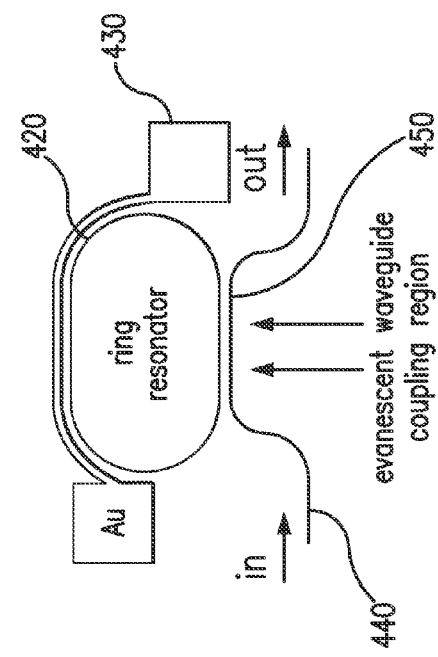
FIG. 4A
FIG. 4B

SYSTEMS AND METHODS FOR TELECOMMUNICATION USING HIGH-DIMENSIONAL TEMPORAL QUANTUM KEY DISTRIBUTION

CROSS-REFERENCE TO RELATED APPLICATIONS

This application is a continuation of International Patent Application No. PCT/US2013/021923, which claims priority to U.S. Provisional Application Ser. No. 61/589,610, filed Jan. 23, 2012, U.S. Provisional Application Ser. No. 61/673,374, filed Jul. 19, 2012, and U.S. Provisional Application Ser. No. 61/714,951 filed Oct. 17, 2012, each of which is incorporated herein by reference in its entirety and from which priority is claimed.

STATEMENT OF FEDERALLY SPONSORED RESEARCH OR DEVELOPMENT

This invention was made with government support under the DARPA Information in a Photon program, through grant No. W911NF-10-1-0416, awarded by the Army Research Office. The government has certain rights in the invention.

BACKGROUND

The disclosed subject matter relates to techniques for quantum key distribution, including high dimensional temporal quantum key distribution using dispersive optics.

Secure key distribution can be an important functionality for security in cryptographic systems. Generally, cryptographic systems are designed for secure transmission of private information between two parties (commonly referred to as Alice and Bob). Transmission of data over a classical communication channel involves the risk that an eavesdropper (commonly referred to as Eve) can intercept the data. To safeguard data transmitted over a classical communication channel, the data can be encrypted using a cryptographic key prior to transmission. However, in order to be decrypted, the cryptographic key must be known by the receiving party, and to further the objectives of the cryptographic system this key must not be known to any eavesdropper (i.e., the key is a shared secret between Alice and Bob). Accordingly, establishing a secret key (also referred to as a "private" key) between Alice and Bob is important to developing secure communication.

Quantum key distribution (QKD) is a technique that leverages the underlying physics of quantum mechanical interactions to ensure that shared keys are not intercepted by any third parties. Conventional QKD systems typically employ protocols utilizing photon polarization (or phase) states to encode data. For example, in the well known BB84 QKD protocol, a photon can be transmitted from Alice to Bob, each of which can prepare/measure the photons in non-orthogonal quantum "bases" (e.g., a rectilinear basis of polarization 0° and 90°; and a diagonal basis of polarization 45° and) 135°. Because these bases are non-orthogonal, no possible measurement distinguishes between the 4 different polarization states. That is, measurement in a rectilinear basis will result in a measurement of either 0° or 90°, even if the photons were prepared in a diagonal basis of 45° or 135°, introducing error for measurement in an incorrect basis.

Alice and Bob can randomly select which basis to prepare/measure in and share this information over a public channel. Measurements in the same basis can then be used to generate a secret key (e.g., measurements in the rectilinear basis of 0° can be assigned a binary value of 0, measurements in the rectilinear basis of 90° can be assigned a binary value of 1, measurements in the diagonal basis of 45° can be assigned a value of 0, and measurements in the diagonal basis of 135° can be assigned a value of 1). Because the basis of measurement is randomized, some of Eve's measurements will be made in a non-orthogonal basis, and such measurements will be incorrect 50% of the time. Additionally, measurements by Eve will introduce errors into the measurements of Bob and Alice. Accordingly, Alice and Bob can detect an eavesdropping event. Such a technique can generally be referred to as a "prepare and measure" QKD protocol (i.e., one party can prepare, and the other party can measure).

There exist certain techniques for QKD involving the use of measuring photons in unified bases. For example, the well known E91 and BBM92 protocols involve the use of entangled pairs of photons generated by a common source and transmitted to Alice and Bob. Alice and Bob can each measure in randomly selected bases as with the BB84 protocol. Such techniques can generally be referred to as an "entanglement based" QKD protocol (i.e., each party receives one photon from an entangled pair).

Protocols using polarization or phase states can be characterized by low dimensionality, resulting in low data rates. While degrees of freedom with higher dimensionality, such as position-momentum, energy-time, and orbital angular momentum can be utilized, they can be sensitive to external effects, reducing the practicality of such systems. Additionally, such systems can lack a "security proof" (i.e., the net information transmitted from Alice to Bob is positive after privacy amplification).

SUMMARY

The disclosed subject matter provides techniques for quantum key distribution.

In one aspect of the disclosed subject matter, a method for temporal quantum key distribution between at least a first entity and a second entity includes measuring an arrival time of each of a plurality of photons within each of a set of time frames. The arrival time can correspond to one of the plurality of time bins within the time frame. Measuring can occur in a randomly selected one of at least two mutually unbiased bases. The mutually unbiased bases can include a basis corresponding to a measurement with dispersion and a basis corresponding to a measurement without dispersion. The randomly selected basis for each time frame can be communicated, via a classical communications channel. A quantum key can be generated from the time bins corresponding to the arrival time of photons within at least some of the time frames for which the randomly selected basis is consistent between the first and the second entity.

A security check can be performed on a subset of the time frames for which the randomly selected basis is consistent between the first and the second entity. The time bins corresponding to the arrival times of the photons within the subset of frames can be communicated via the classical communications channel. An error metric can be generated from a comparison of the time bins for each of the time frames in the subset.

The arrival times can be measured in the mutually unbiased bases by routing a photon through a transmission path corresponding to the randomly selected basis. When the randomly selected basis corresponds to a measurement with dispersion, the photon can be routed through a transmission path having dispersive optics. When the randomly selected basis corresponds to a measurement without dispersion, the photon can be routed through a transmission path without dispersive optics.

In one embodiment, the method can include generating pairs of first and second photons. For each photon pair, the first entity can measure, in a first randomly selected basis, an arrival time of the first photon and the second entity can measure, in a second randomly selected basis, an arrival time of the second photon. The quantum key can be generated from each of the time bins, corresponding to the arrival time of each photon pair, within at least some of the time frames for which the first randomly selected basis corresponds to the second randomly selected basis. The basis corresponding to measurement with dispersion at the first entity can include a measurement with normal dispersion. The basis corresponding to measurement with dispersion at the second entity can include a measurement with anomalous dispersion.

In one embodiment, the method can include generating pairs of first and second photons at the first entity. For each photon pair, the first entity can measure an arrival time of the first photon in the basis corresponding to a measurement without dispersion. The second photon can be prepared, at the first entity, in a first randomly selected basis, and the first entity can record the first randomly selected basis. The second photon can be transmitted to the second entity, and the second entity can measure, in a second randomly selected basis, an arrival time of the second photon. The quantum key can be generated from the time bins, corresponding to the arrival time of each photon pair, within at least some of the time frames for which the first randomly selected basis corresponds to the second randomly selected basis. The second photon can be randomly prepared in either a basis corresponding to normal dispersion, or without dispersion. The basis corresponding to measurement with dispersion at the second entity can include a measurement with anomalous dispersion. The second photon can further be routed through a variable delay driven by a random number generator prior to transmission to the second entity, and the delay generated by the variable delay can be recorded by the first entity.

In one embodiment, a stream of single photons can be generated for transmission through an optical fiber from the first entity to the second entity. At the first entity, the transmission of the stream of single photons can be randomly modulated to generate a random transmission pattern. The photons in the stream of single photon can be randomly prepared in one of two mutually unified bases. The second entity can detect an arrival time of photons within the stream of single photons in a randomly selected basis. The quantum key can be generated from the random transmission pattern and the detected arrival time of the photons in the stream detected in a corresponding mutually unified basis as randomly applied to the stream of single photons.

In another aspect of the disclosed subject matter, a system for temporal quantum key distribution between a first entity and a second entity includes a receiver, including at least one single photon detector adapted to receive a plurality of photons. The receiver can be configured to measure an arrival time of each photon within each of a set of time frames. The arrival time can correspond to one of a plurality of time bins within each time frame. An optical element can randomly direct each photon to the detector through a first optical path with dispersive optics or a second optical path without dispersive optics. The first optical path can correspond to a first of the mutually unbiased bases, and the second optical path can correspond to a second of the mutually unbiased bases. The system can include a classical communication channel for communicating the randomly selected basis for each of the time frames. One or more processors can be configured to generate a quantum key from each of the plurality of time bins, corresponding to the arrival time of each of the plurality of photons, within at least some of the time frames for which the randomly selected basis is consistent between the first and the second entity.

The processors can be configured to perform a security check on a subset of the time frames for which the randomly selected basis is consistent between the first and the second entity. The processors can be configured to communicate, via the classical communications channel, the time bins corresponding to the arrival times of photons within each of the subset of frames. The processors can be configured to generate an error metric from a comparison of the time bins for each of the subset of frames.

In one embodiment, the optical element can include a two-by-two optical switch adapted to randomly switch between the first optical path and the second optical path. In one embodiment, the optical element can include a bean splitter adapted to randomly direct photons to the first optical path or the second optical path.

In one embodiment, the receiver, the optical element, and at least one processor can be associated with the first entity. A second receiver, associated with the second entity, can be configured to measure an arrival time of each photon with each of the set of time frames. A second optical element, associated with the second entity, can randomly direct each photon to a single photon detector associated with the second element through either a first optical path with dispersive optics, or a second optical path without dispersive optics. A second processor, associated with the second entity, can be coupled with the second receiver and the classical communications channel. The optical path with dispersive optics associated with the first entity can include dispersive optics adapted to impart normal dispersion. The optical path with dispersive optics associated with the second entity can include dispersive optics adapted to impart anomalous dispersion.

In one embodiment, the system can include a photon pair source for generating pairs of photons. The photon pair source can be configured to transmit one photon of each photon pair to each of the first and second entity. The processors associated with the first and second entities can generate a quantum key from the plurality of time bins, corresponding to the arrival time of the respective photon of each photon pair, within at least some of the time frames for which the randomly selected basis is consistent between the first and the second entity.

In one embodiment, the second receiver can be adapted to measure an arrival time photons routed through a path without dispersive optics. A corresponding photon can be prepared in a randomly selected basis and transmitted to the first entity, and the randomly selected basis can be recorded by the second entity.

In one embodiment, the receiver, the optical element, and at least one processor can be associated with the first entity. A continuous wave laser can be configured to emit photons through an optical fiber transmission channel coupled with the first entity. An attenuator, coupled with the continuous wave laser, can be adapted to attenuate the emitted photons such that single photons are transmitted with a predetermined average separate time. An electro-optic modulator, associated with the second entity, can be configured to randomly select when the optical fiber transmission channel is in an open state or a closed state, such that only photons present when the channel is open are transmitted. A second optical element can be adapted to receive the transmitted photons, and. A second processor, associated with the second entity, can be configured to record the state of the transmission channel and record the randomly selected basis resulting from randomly directing each of the transmitted photons through the first optical path or the second optical path. The processor associated with the first entity and the second processor associated with the second entity can be configured to generate a quantum key from each of the plurality of time bins, corresponding to the arrival time of transmitted photons within at least some of the time frames for which the recorded randomly selected basis of the second entity is consistent with the randomly selected basis of the first entity.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the disclosed subject matter. Together with the description, the drawings serve to explain the principles of the disclosed subject matter.

BRIEF DESCRIPTION OF THE DRAWINGS

FIG. 2A is a schematic diagram of a system for temporal quantum key distribution in accordance with another exemplary embodiment of the disclosed subject matter.

FIG. 2B is a schematic diagram of a system for temporal quantum key distribution in accordance with another exemplary embodiment of the disclosed subject matter.

FIG. 2C is a schematic diagram of a system for temporal quantum key distribution in accordance with another exemplary embodiment of the disclosed subject matter.

FIG. 4A is a schematic diagram of a series of exemplary dispersive elements in accordance with an embodiment of the disclosed subject matter.

FIG. 4B is a schematic diagram of a ring resonator of a dispersive element as depicted in FIG. 4A.

Figure 1A:
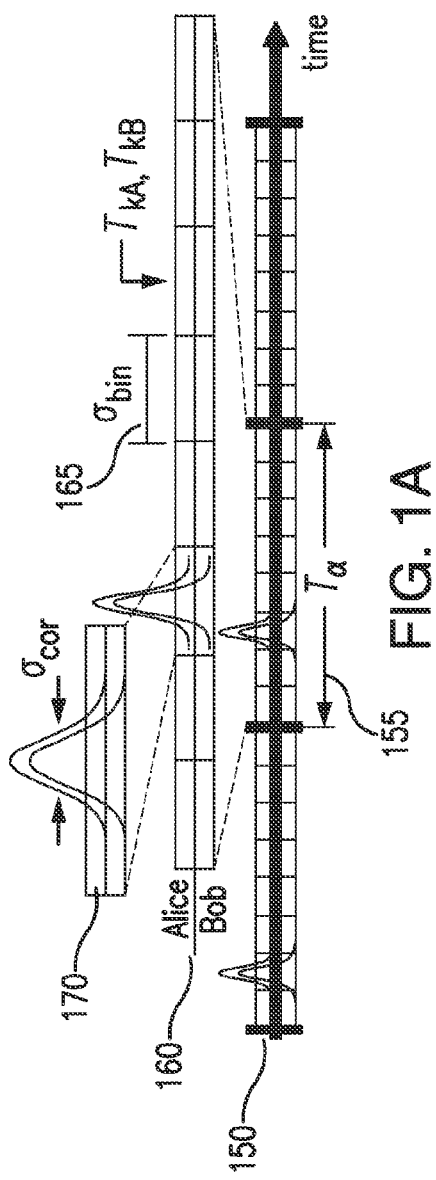
FIG. 1A illustrates an exemplary temporal quantum key distribution protocol in accordance with the disclosed subject matter.

Throughout the drawings, the same reference numerals and characters, unless otherwise stated, are used to denote like features, elements, components or portions of the illustrated embodiments. Moreover, while the disclosed subject matter will now be described in detail with reference to the Figs., it is done so in connection with the illustrative embodiments.

DETAILED DESCRIPTION

The disclosed subject matter provides techniques for quantum key distribution, including high dimensional temporal quantum key distribution using dispersive optics.

As disclosed herein, high dimensional temporal quantum key distribution can include using dispersion elements to switch between mutually unbiased bases (MUB). For purposes of illustration and not limitation, and in accordance with the parlance of QKD literature, a party sending a quantum key can be referred to as "Alice" whereas the party receiving the quantum key can be referred to as "Bob." An eavesdropper to the transaction can be referred to as "Eve." Generally, Alice and Bob can obtain a secure key by continuously switching their measurements between the MUBs (for example, applying or not-applying dispersion). If they both apply the same MUB, they can record a click on a photon detector at the same time, using synchronized clocks (e.g., synchronized via a pulse signal transmitted from one party to the other). However, if they apply different MUBs then measurement error will result. The key can be derived based on photons received and measured in the same MUB. Eve does not know what MUBs each party applies at each time, and thus will introduce measurable error and be detectable.

Throughout the description that follows, for purpose of notation, the terms "Alice," "Bob," and "Eve" are used to refer to a sender, receiver, and eavesdropper, respectively, in connection with a quantum key distribution system. One of ordinary skill in the art will appreciate that such terms include components responsible for their respective functions. For example, "Alice" can refer collectively to a "party" to a quantum key exchange transaction, including the physical components required to participate in the transaction, such as one or more processors, quantum communications channels, photon detectors, and/or optics. In certain embodiments, "Alice" and "Bob" can refer to a collection of elements on a single chip (e.g., portions of a chip connected via one or more waveguides in a photonic integrated chip). Alternatively, "Alice" and "Bob" can refer to a collection of elements between chips on a single board, or between nodes in a telecommunications network (e.g., entities connected via a fiber optic or other network). In this manner, and as used herein, a "party" to a quantum key exchange transaction need not refer to a human; rather, a "party" refers collectively to components that make up an entity of the transaction.

Further, one of ordinary skill in the art will appreciate that as disclosed herein, quantum key distribution refers to the sharing of a secret key which can be used to encrypt and decrypt messages. That is, while Alice and Bob can be communicatively coupled, e.g., via one or more classical communication channels, the disclosed subject matter is not intended to be limited with regard to communication and/or encryption after generation of the secret key. For example, the disclosed subject matter can provide a secret key for use in any type of encryption, but need not be. For purpose of example, and not limitation, a secret key generated in accordance with the disclosed subject matter can be used to encrypt and decrypt data sent across a classical communication channel. Additionally or alternatively, such a key can be used as a seed to generate additional secret keys for enhanced security. Likewise, a plurality of secret keys can be generated in accordance with the disclosed subject matter and applied in a predetermined fashion to encrypt data sent over a classical communication channel to further enhance security.

In accordance with the disclosed subject matter, entangled photons can be used for QKD. Such photon pairs can be generated by, for example, spontaneous parametric down conversion. One photon of the pair can be directed to Bob and the other to Alice. Bob and Alice can each randomly apply dispersion or not prior to detecting the timing of the photon. Measurements made in the same basis can be time-correlated, and thus can be used for generation of the secret key. Alternatively, an analogous prepare-and-measure technique can be used with photon pairs. That is, for example, one photon of the pair can be directed to Alice, who can measure the time of detection. One of the two MUBs (e.g., dispersion or no dispersion) can be applied at random prior to transmission to Bob. Upon receipt, Bob can randomly select one of the two MUBs to apply. If Bob selects the same MUB as was applied prior to transmission, his measurement of detection time will be correlated with Alice's, and thus measurements made in the same basis can be used for generation of the secret key.

In accordance with another exemplary embodiment, conventional telecommunications equipment can be used rather than photon pair generation for generation of non-entangled photons. For example, the power of a signal from a continuous wave laser can be attenuated such that a plurality of single photons can be transmitted with an average separate in time between photons. An electro-optic modulator can be used to randomly open and close the communications channel through which the photons travel, and random sequence of opening times can be known to the sender (Alice) and can correspond to characters for generation of the secret key. The photons from the modulator can be routed through dispersive optics or not with equal probability. A receiver (Bob) can apply dispersion or not also at random upon receipt of the photons, and thus detect photons correlated to the opening time of the modulator if both the sender and the receiver apply dispersion, or both do not apply dispersion. Measurements made in the same basis (e.g., both with dispersion or both without) can be used for generation of the secret key.

As disclosed herein, a security check can be performed to determine the presence of an eavesdropper, Eve. The security check can include selection a subset of the frames for which Alice and Bob have measured in the same basis and publicly sharing their time bin measurements for these time frames. Coincidence detection can be performed over these time frames to measure the correlation between photons measured in the same basis. If present, Eve will have measured some of these photons in a different basis, and thus the correlation time will have increased and thus Eve's presence can be determined.

The accompanying figures, serve to further illustrate various embodiments and to explain various principles and advantages all in accordance with the disclosed subject matter. For purpose of illustration, and not limitation, exemplary embodiments of the disclosed subject matter will now be described with reference to FIGS. 1-7.

With reference to FIG. 1A and in accordance with an exemplary embodiment of the disclosed subject matter, temporal quantum key distribution can generally include a temporal-coding scheme wherein each party measures the detection time of photons over time. Time bins can be agreed upon by Alice and Bob a priori. For example, time bins can be agreed upon over a public communications channel. Timeline 150 represents a series of time bins partitioned into a series of frames each with duration 155. Each frame can include a plurality of bins 165 which can be roughly on the order of magnitude of correlation time 170. Generally, if a photon pair is detected in a given time bin, then that character can be shared between Alice and Bob. That is, the size of the alphabet can be given by the number of time bins 165 in each frame 155.

In one embodiment, Alice and Bob's clocks can be synchronized, for example, by sending a pulse sequence over a classical communication channel 107. As used herein, the term "classical communication channel" can refer to any medium through which a message can be transmitted, such as, for example, wired or wireless electronic transmission channels and/or optical transmission channels. For purposes of example, if each time frame 155 is 64 ns, a synchronization pulse can be sent with a period of 64 ns. Each pulse can be measured, counted, and recorded, such that an arrival-time measurement occurring within the subsequent time frame will be synchronized between Alice and Bob. One of ordinary skill in the art will appreciate, however, that variety of suitable techniques can be used to synchronize Alice and Bob's clocks. For example, the first bin 165 in a frame 155 can begin with each pulse and the last bin can correspond to the end of each pulse, such that the alphabet of bins extends over the duration of the pulse signal.

Figure 1B:
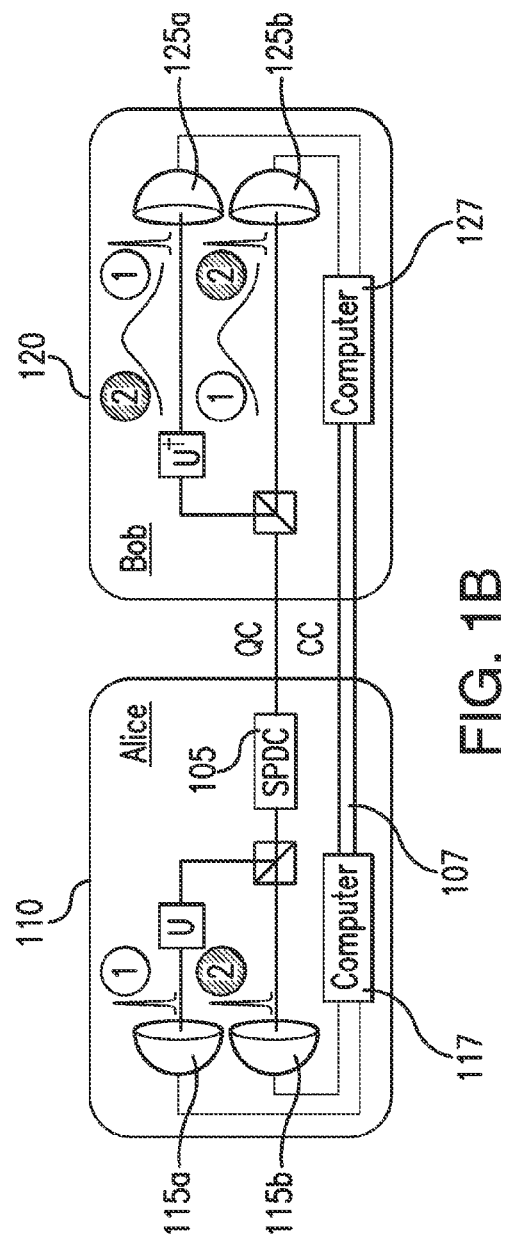
FIG. 1B is a schematic diagram of a system for temporal quantum key distribution in accordance with an exemplary embodiment of the disclosed subject matter.

In an exemplary embodiment, and with reference to FIG. 1B, Alice 110 and Bob 120 can share a synchronized clock. Alice 110 can have two photon detectors 115a and 115b (collectively, 115) and Bob 120 can have two photon detectors 125a and 125b (collectively, 125). Alice 110 can be communicatively coupled with Bob 120 via a classical communication line 107. Alice 110 and Bob 120 can be connected to a photon pair source, such as for example a spontaneous parametric down conversion element (SPDC), 105 via, for example, optical transmission channels. Alice 110 and Bob 120 can each measure one photon of a photon pair generated by the photon pair source 105, with photon detectors 115 and 125 randomly in one of two conjugate bases (i.e., bases that represent time states or superpositions of those time states) corresponding to measurements with and without dispersion. That is, for example Alice 110 and Bob 120 can measure the arrival time of photons from the photon pair source 105, switching randomly between bases.

The photon detectors 115 and 115 can be, for example, single photon avalanche diodes (SPADS) and accompanying instrumentation to measure the time of arrival of a single photon at the detector. For example, the arrival of a single photon at the detector can trigger an avalanche of current, which can allow the detector to detect the arrival time within predetermined jitter. In an exemplary embodiment, the jitter can be on the order of picoseconds. Alternatively, photon detectors 115 and 115 can be, for example superconducting nanowire single-photon detectors (SNSPDs). One of ordinary skill in the art will appreciate that a variety of suitable single photon detectors can be used, and the disclosed subject matter is not limited to the illustrative examples described herein.

The photon pair source 105 can be, for example, a spontaneous parametric down conversion element, which can include a pump light source to generate pairs of entangled photons. Each photon of the photon pair can be directed to Alice and Bob, respectively, using conventional techniques. For example, the photon pair can be directed through a waveguide (including, e.g., an optical fiber or photonic crystal waveguide), and can be split using conventional optical elements, such as a 50:50 beam splitter or other variable beam splitter, such that one photon is sent to Alice 110 and one photon is sent to Bob 120. Alternatively, the photons can be transmitted through free-space.

For purposes of illustration and not limitation, in an embodiment where Alice 110 share a clock with Bob 120, the SPDC 105 can generate a biphoton state (i.e., a superposition state with a lifetime given by the coherence time of the pump field, $\sigma_{coh}$, and correlated to some time, $\sigma_{cor}$, determined by the phase matching bandwidth of the SPDC source). That is, for example, the detection of one photon of the pair can be correlated with the detection time of the other photon of the pair.

For purposes of illustration, and not limitation, the correlation between photons can be given as a Gaussian distribution, which can be characterized by, e.g., its full width at half maximum, $\sigma_{cor}$. One of ordinary skill in the art will appreciate that the correlation distribution can take any suitable functional form, and $\sigma_{cor}$ can be any metric of correlation between the first and second photons. $\sigma_{coh}$ can be as long as a millisecond for a standard diode laser, and $\sigma_{cor}$ can be on the order of hundreds of femtoseconds to several picoseconds for conventional SPDC sources. The resulting number of information eigenstates can be given by the Schmidt number $K \approx \sigma_{coh}/\sigma_{cor} = d$, however in certain embodiments the number of information eigenstates can be limited to $K \leq 100$.

For a weak pump at frequency $\omega_p$ and operation at frequency degeneracy, the down-converted state can be approximated by $$|\Psi_{AB}\rangle = \int\int \psi(t_A, t_B) e^{i\frac{w_p}{2}(t_A+t_B)} |t_A t_B\rangle dt_A dt_B, \quad 1$$

where $\psi(t_A,t_B) \propto e^{-(t_A-t_B)^2/4\sigma_{cor}^2} e^{-(t_A t_B)^2/16\sigma_{cor}^2}$, $|t_A,t_B\rangle = \hat{a}^*_A(t_A) \hat{a}^*_B(t_B)|0\rangle$, and $\hat{a}^*_{A,B}(t_j)$ denote the creation operators at time $t_j$ for Alice and Bob, respectively. As noted above, in an exemplary embodiment Alice 110 and Bob 120 can measure randomly in one of two conjugate bases (i.e., bases that represent time states or superpositions of those time states). That is, Alice and Bob can measure the arrival times of their photons, switching randomly between bases. After transmission, Alice and Bob can publicly compare the bases of their measurements. For example, Alice 110 and Bob 120 can transmit the bases of their measurements over classical transmission line 107, and each party can compare their measurement bases to that of the other party using, e.g., one or more computers 117 and 127. In one embodiment, only frames in which measurement was made in the same basis are kept. A secret key can be built based on the correlated timing events, and error correction and privacy amplification can be employed to reduce errors and minimize and eavesdropper's information.

As noted above, randomly switching between bases can include the use of dispersive optics. In an exemplary embodiment, switching between measurement bases can include coupling the photon upon arrival to Alice or Bob into a variable beam splitter or passive optical switch, such that one optical path corresponds to the detector 115a or 125a for measurement in the dispersed basis and the other optical path corresponds to the detector 115b or 125b for measurement without dispersion. In this embodiment, Alice and Bob can determine their measurement basis by the detector that measures the arrival-time of the single photon. In other embodiments, as described in more detail below, a single photon detector can be used for each of Alice 110 and Bob 120, in connection with the use of an active switch, such that the measurement basis can be determined with the active switch.

Figure 3A:
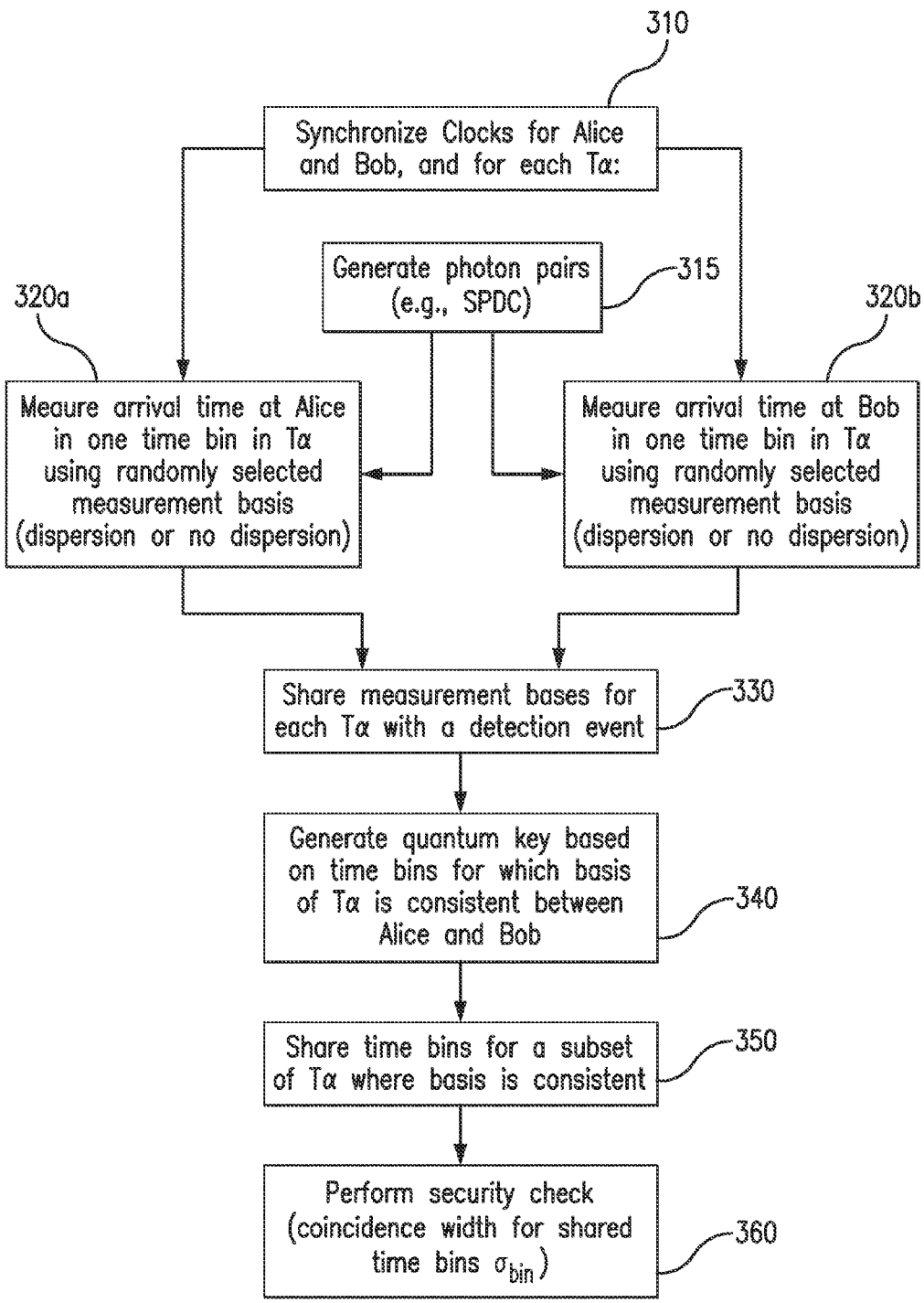
FIG. 3A is a flow diagram of a method for temporal quantum key distribution in accordance with an exemplary embodiment of the disclosed subject matter.

FIG. 3A depicts a method in accordance with an exemplary embodiment of the disclosed subject matter. Alice 110 and Bob 120 can synchronize (310) their clocks, as described herein, so as to define a number of time frames, $T\alpha$. A photon pair source, such as a SPDC, can generate photon pairs (315), and one photon of each photon pair can be directed to Alice, and the other photon of each photon pair can be directed to Bob. Alice can measure (320a) the arrival time of a photon from the SPDC in a randomly selected basis (e.g., with normal dispersion or without). Each arrival time measurement by Alice can correspond to a time bin within a time frame. Likewise, Bob can measure (320b) the arrival time of the other photon from the SPDC in a randomly selected basis (e.g., with anomalous dispersion or without). Alice and bob can share (330) the randomly selected measurement bases for each time frame, for example, via the classical communication channel. A quantum key can be generated (340) based on the time bins corresponding to the arrival time of photons within each time frame for which the randomly selected basis is consistent (e.g., where Alice selects normal dispersion and Bob selects anomalous dispersion, and where Alice selects no dispersion and Bob selects no dispersion). A security check can be performed by sharing (350) the measured time bins for a subset of the time frames for which the basis is consistent, and determining an error metric (360) (e.g., coincidence width) for the shared time bins, to thereby detect the presence of an eavesdropper.

For purposes of illustration, use of second-order dispersion (SOD) in connection with an exemplary embodiment will be described. SOD can be characterized by the parameter $\beta_2 = \partial^2/\partial\omega^2 (n_{\mathit{eff}}\omega/c)$, where $n_{\mathit{eff}}$ is the effective index of the mode, $\omega$ is the mode frequency, and c is the speed of light in a vacuum. A second-order dispersive element can impart a phase on each frequency state $\phi \propto \beta_2 \omega^2$. Physically, $\beta_2$ can be proportional to the linear change in the group velocity as a function of frequency. The SOD operator can be unitary and its frequency domain representation, $\Delta$ can be diagonal. The time domain representation can be referred to as $\hat{U}$.

Classically, a transform-limited pulse can be spread in a dispersive medium as its frequency components move out of phase. However, if photons of $|\Psi_{AB}\rangle$ are sent through dispersive media, for large $\sigma_{coh}$, $\sigma_{cor}$ can become:

$$\sigma'^2_{cor} \approx \frac{\sigma^4_{cor} + (\beta_{2A}L_A + \beta_{2B}L_B)^2}{\sigma^2_{cor}}, \quad 2$$

where $\beta_{2A}$ is the group velocity dispersion (GVD) introduced by Alice over length $L_A$ and $\beta_{2B}$ is the GVD introduced by Bob over length $L_B$ and $\beta_{tot} = \beta_{2A} + \beta_{2B}$. As $\beta_{tot}$ increases, the temporal correlation between Alice's and Bob's photon decreases. However, $\sigma'_{cor} = \sigma_{cor}$ if $\beta_{2A} = -\beta_{2B} = \beta_2$, which can require that, to a global phase, $$\hat{\Delta}_A = \int e^{-i\frac{1}{2}\beta_{2A}L\omega_o^2} |\omega_o\rangle\langle\omega_o| d\omega_o = \hat{\Delta}^*_B,$$

where $\omega_o$ is the frequency detuning from the center frequency of the biphoton pulse. Therefore, if Alice applies a normal dispersion, $\hat{U}_A$, on her photon, Bob can apply anomalous dispersion, $\hat{U}_B=\hat{U}^*_A$, on his photon to recover the temporal correlations between their photons.

Figure 4C:
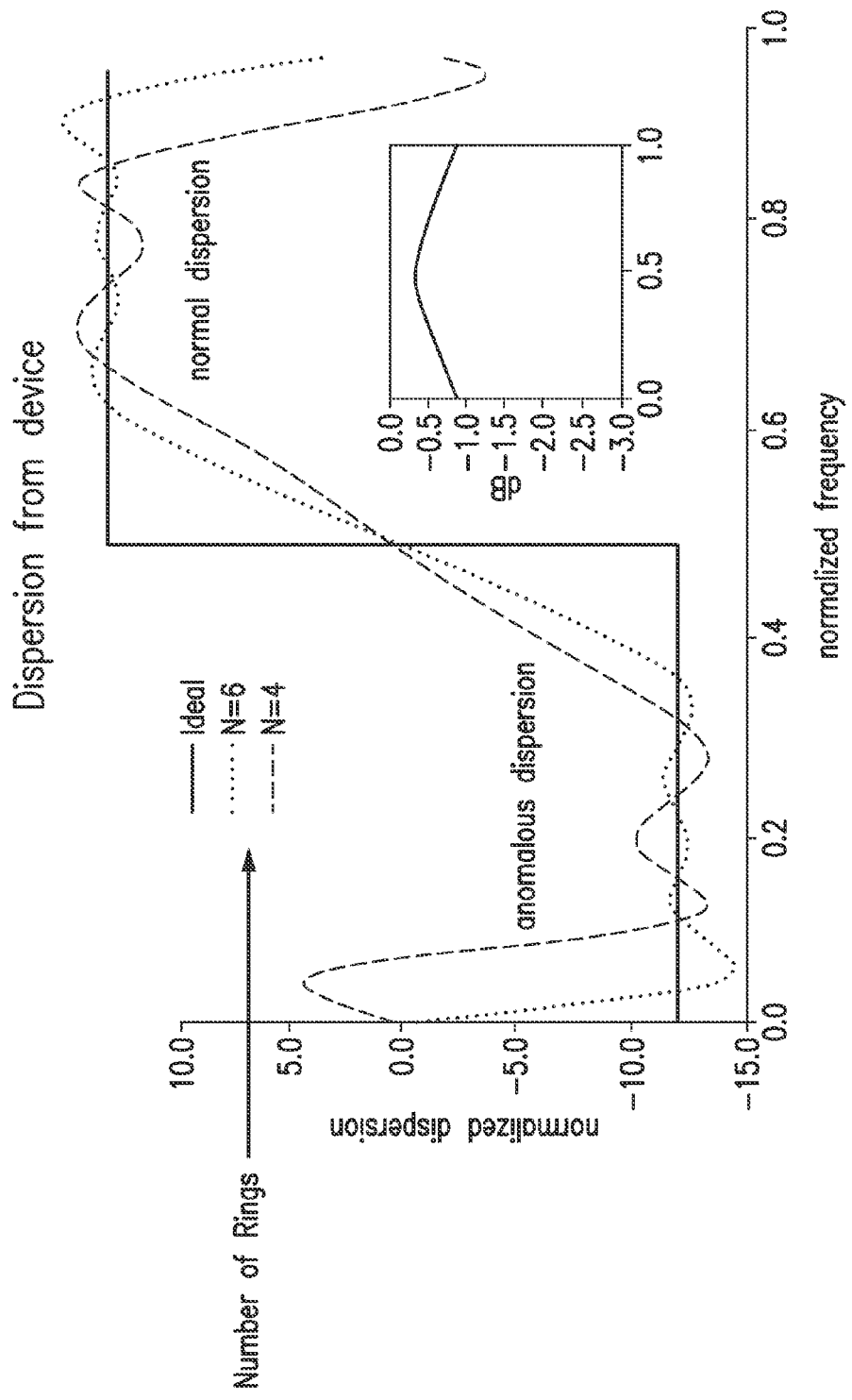
FIG. 4C is an illustrative plot of dispersion resulting from a dispersive element as depicted in FIG. 4A as a function of frequency and number of ring resonators.

In an exemplary embodiment, the measurement basis with dispersion can correspond to an optical path with conventional dispersive elements disposed therein. For example, with reference to FIG. 4, dispersive elements can include dispersive elements fabricated within waveguide circuits. FIG. 4A depicts a series of exemplary dispersive elements (e.g., 410a, 410b, and 410c), each consisting of a waveguide with six ring resonators 420 tuned with heating pads 430. FIG. 4B illustrates an exemplary ring resonator in accordance with the disclosed subject matter. For example, photon can travel along a waveguide 440 into the ring resonator 420. An evanescent waveguide coupling region 450 can couple the photon into the ring resonator, which can have a gold heating pad 430, which can tune the resonance. The ring resonator 420 can include group velocity dispersion as a function of its resonant frequency. Depending on the resonance frequency, both normal and anomalous dispersion can be induced. FIG. 4C illustrates an illustrative plot of the strength of the group velocity dispersion as a function of frequency, with the inset illustrating the amplitude response. One of ordinary skill in the art will appreciate that a variety of suitable dispersive elements can be used, and the disclosed subject matter is not intended to be limited in scope to the exemplary embodiments described herein.

In an exemplary embodiment, additional optical elements can be included in the transmission paths of the photons to correct for background dispersion. That is, for example, dispersion can occur during transmission of a photon through an optical fiber to Alice or Bob, and the amount of dispersion can correspond to the length of the optical fiber transmission. Conventional optical processing techniques, such as the use of anomalous dispersion elements, can be used to eliminate the dispersion arising from transmission through an optical fiber. As described herein, measurement in the dispersed basis includes the use of further dispersive elements after the background dispersion has been corrected. For example, measurement without dispersion can correspond to a transmission path that has been corrected for background dispersion, and measurement with dispersion can correspond to a transmission path that has been first corrected for background dispersion, and subsequently processed to apply either normal or anomalous dispersion.

In an exemplary embodiment, and as noted above, the dispersion operator applied by Alice can be opposite to that applied by Bob. For example, if Alice applies normal dispersion, Bob can apply anomalous dispersion equal in magnitude to the dispersion applied by Alice. Such dispersion can be accomplished, e.g., by tuning the dispersion elements as described with reference to FIG. 4. Where Alice and Bob both measure in the dispersed basis and Alice and Bob apply opposite dispersion, they can obtain correlated arrival-time measurements.

In an exemplary embodiment, a security check can be performed to determine the presence of an eavesdropper. The security check can include selection a subset of the timeframes for which Alice and Bob have measured in the same basis and publicly sharing their time bin measurements for these time frames. Coincidence detection can be performed over these time frames to measure the correlation between photons measured in the same basis. Eve will invariable have measured some of these photons in a different basis, and thus the correlation time will have increased. Thus, Eve's presence can be determined.

For purposes of illustration, and not limitation, description will now be made to an exemplary security check with regard to secret-key capacity. The secret-key capacity can be calculated, as given by:

$$\Delta I = \beta I(A,B) - \chi(A,E),\qquad 3$$

where $\beta$ is the reconciliation efficiency, $I(A,B)$ is the mutual information between Alice and Bob, and $\chi(A,E)$ is Eve's Holevo information about Alice's transmission. The covariance matrix $\Gamma$, which can be given by the expectation values of the anti-commutators of the measurement operators used in the basis measurements, can be used. Assuming the output state of the SPDC is Gaussian, and the low-flux limit is given by equation 1, Gaussian attacks can be defined as optimal collective attacks for a measured covariance matrix. Security against collective attacks can imply asymptotic security against general attacks. Therefore, the secret-key capacity can be calculated using $\Gamma$ and Gaussian attacks can be assumed to establish an upper bound on Eve's information given general coherent attacks.

For purpose of illustration, and not limitation, the arrival-time measurement operators can be given as $\hat{T}_i = \int t_i |t_i\rangle\langle t_i| dt_i$, and the dispersed arrival-time measurement operators can be given as $$\hat{D}_i = \frac{1}{\beta_{2i}L} \hat{U}_i^* \hat{T}_i \hat{U}_i,$$

where $i \in \{A,B\}$ and $[\hat{T}_A,\hat{D}_A]=[\hat{T}_B,\hat{D}_B]=i$. The covariance matrix can thus be written as:

$$\Gamma = \begin{pmatrix} \gamma_{AA} & \gamma_{AB} \\ \gamma_{BA} & \gamma_{BB} \end{pmatrix},\qquad 4$$

where, for example, the matrix $\gamma_{BA}$ describes the covariance between the measurements of Bob and Alice. In the absence of excess noise, $$\gamma_{AA} = \begin{pmatrix} \frac{u+v}{16} & -\frac{u+v}{8k} \\ -\frac{u+v}{8k} & \frac{(u+v)(4k^2+uv)}{4k^2uv} \end{pmatrix} \qquad 5$$

$$\gamma_{AB} = \gamma_{AB}^T = \begin{pmatrix} \frac{u-v}{16} & \frac{u-v}{8k} \\ -\frac{u-v}{8k} & -\frac{(u+v)(4k^2+uv)}{4k^2uv} \end{pmatrix},$$

$$\gamma_{BB} = \begin{pmatrix} \frac{u+v}{16} & \frac{u+v}{8k} \\ \frac{u+v}{8k} & \frac{(u+v)(4k^2+uv)}{4k^2uv} \end{pmatrix}$$

where $u=16\sigma_{coh}^2$, $v=4\sigma_r^2$, and $k=2\beta_2 L$. Accordingly, for large dispersion, the covariance matrix can converge to that for frequency and arrival-time measurements.

In an exemplary embodiment, the measurement bases can be conjugate and the covariance matrix technique can be used. In such an embodiment, the GVD introduced over the length of the transmission line can be greater than the product of the coherence time and the correlation time, i.e., $\beta_2 L \gg \sigma_{coh}\sigma_{cor}$. However, allowing for finite $\sigma_{coh}$ in the case of $\beta_{2A}=-\beta_{2B}$, $\sigma_{cor}^2$ and $\sigma_{coh}^2$ can become $\sigma''_{cor}{}^2=\rho_{cor}^2+(\beta_2L/\sigma_{coh})^2$ and $\sigma''_{coh}{}^2=\sigma_{coh}^2+(\beta_2L/\sigma_{cor})^2$, respectively. In this limit, $\sigma''_{coh}$ can be significantly larger than $\sigma_{cor}$, and $\sigma''_{cor}$ can be significantly larger than $\sigma_{coh}$, thus increasing the time spent acquiring correlations in the dispersed basis. However, the effect on data rate can be made negligible small using asymmetric basis selection or using heralding as described herein.

In an exemplary embodiment, excess noise and loss of correlations due to either Eve or the transmission channel can be accounted for. For example, for excess noise $\epsilon$ and loss of correlations $\eta$, the covariance matrix can become:

$$\Gamma_n = \begin{pmatrix} \gamma_{AA} & (1-\eta)\gamma_{AB} \\ (1-\eta)\gamma_{BA} & (1+\epsilon)\gamma_{BB} \end{pmatrix}. \qquad 6$$

Figure 5:
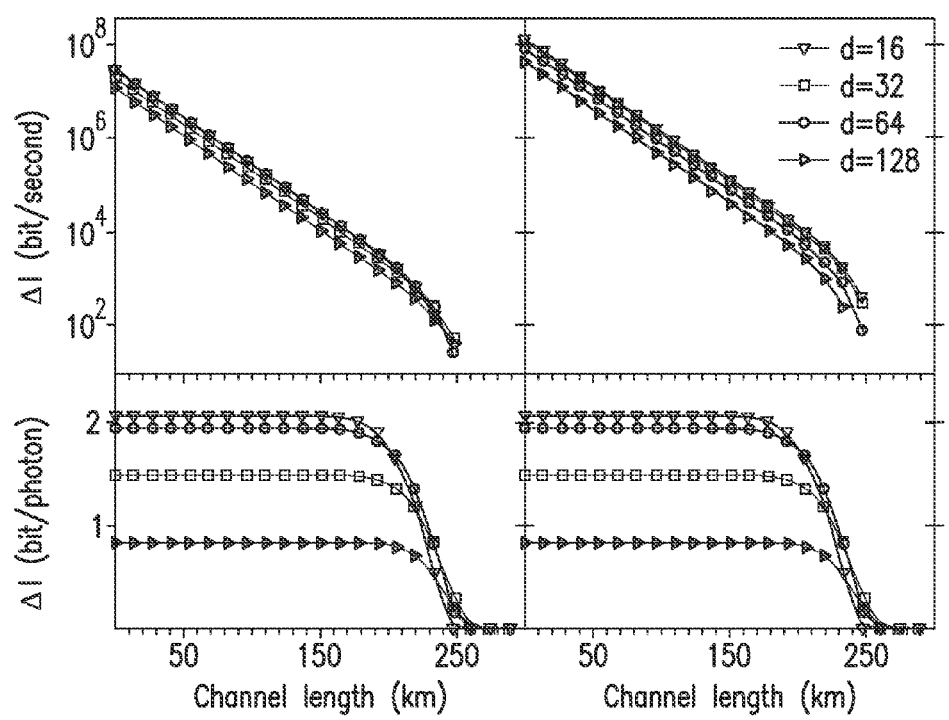
FIG. 5 is a plot of secret-key capacity as a function of channel length in connection with exemplary embodiments of the disclosed subject matter.

Alice's auto-covariance matrix need not depend on $\epsilon$ and $\eta$ because her setup is not accessible to Eve. The Holevo information can be calculated from the symplectic eigenvalues of $\Gamma_n$. I(A,B) can be calculated from the time and dispersed-time correlation coefficients, using $\hat{T}'$ and $\hat{D}'$ to include noise due to jitter and dark counts, taken, e.g., as Gaussian distributed random variables. $\Delta I$ can then be calculated given a lower bound on I(A,B) and an upper bound on $\chi(A,E)$, plotting the results as depicted in FIG. 5, for alphabet sizes d=16, d=32, d=64, and d=128. That is, FIG. 5 depicts secret-key capacity as a function of channel length assuming a constant photon emission rate for call coherence times; $\sigma_{cor}$=30 μs; propagation loss α=0.2 dB/km; detector timing jitter J=20 ps; Alice and Bob system detection efficiencies of 50%; $\epsilon=\eta$=0.1%; probability of dark counts per frame, $P_D=10^{-6}$; β=0.9; and expected number of pairs per frame assuming heralding, $\bar{n}$=0.6. The right plots depict bits per second and bit per photon (i.e., bits per frame in which Alice and Bob measure in the same basis) for pair generation rate $\gamma_\nu$=⅓ GHz. Likewise, the left plots depict bits per second and bit per photon (i.e., bits per frame in which Alice and Bob measure in the same basis) for pair generation rate $\gamma_\nu=\bar{n}/(d\cdot\sigma_{cor})$.

As demonstrated by FIG. 5, for purpose of example and not limitation, even with general coherent attacks, Alice and Bob can still share a large amount of information per second using the techniques disclosed herein. For example, taking $\epsilon=\eta$=0.1% defined for all d with respect to d=64, $\epsilon$ can correspond to an increase in the standard deviation of Bob's auto-covariance elements, and $\eta$ can relate to a decrease in the standard deviation of Alice and Bob's joint covariance elements, both of approximately 1 ps. The maximum transmission length shown, approximately 250 km, can be significantly longer relative conventional QKD protocols, which can be limited to 25 km transmission. That is, in accordance with the techniques disclosed herein, Eve cannot obtain more signal photons from Alice than Bob. As a result, $\epsilon$ and $\eta$ do not increase with loss; $\Delta I$ decreases to zero only when the probability of registering a dark count approaches the probability of Bob detecting a photon.

With reference to FIG. 2A and in accordance with another exemplary embodiment of the disclosed subject matter, techniques for temporal key distribution can include the use of active 2×2 switches (active switches 217a and 217b for Alice [collectively, 217] and active switches 227a and 227b for Bob [collectively, 227] and one single photon detector (215 and 217) for each Alice 110 and Bob 120, respectively. In this exemplary embodiment, instead of passively switching the photons generated from the photon pair source 105, the active switches 217 and 227 can randomly switch the transmission path and actively record which transmission path was selected. That is, for example, one photon of the photon pair can be directed to Alice 110. Upon arrival, the first 2×2 switch 217a can randomly select a transmission path, one corresponding to a path with dispersion, and one corresponding to a path without. The second optical switch 217b can switch the selected transmission path to the single photon detector 215. Likewise, the other photon of the photon pair can be directed to Bob 120. Upon arrival, the first 2×2 switch 227a can randomly select a transmission path, one corresponding to a path with dispersion, and one corresponding to a path without. The second optical switch 227b can switch the selected transmission path to the single photon detector 225. In this manner, the secret key can be generated as described herein above with only one single photon detector at each party. The active switches can be, for example Mach-Zehnder interferometers (MZIs) modulated by carrier injection or MZIs modulated by carrier depletion. Alternatively, the active switches can be ring modulators or other resonant structures such as photonic crystal cavities, micro-toroidal resonators or Fabry-Perot-type cavities, all in either a single-resonator or coupled-resonator geometry. The active switches can be coupled to the input waveguide and can be controlled by carrier injection or depletion. Carrier injection can be accomplished, for example, by electrical or optical stimulation. If by optical stimulation, it can be by single-photon above-band absorption or by below-band multi-photon absorption, such as two-photon absorption.

With reference to FIG. 2B and in accordance with another exemplary embodiment of the disclosed subject matter, techniques for temporal key distribution can include a prepare and measure technique. In this exemplary embodiment, one photon of a photon pair generated by photon pair generator 105 can be detected directly by Alice 110 at detector 215. The other photon of the photon pair can be randomly switched with active switches 237a and 237b (collectively, 237). The switches 237 can randomly switch the transmission path and actively record which transmission path was selected. The switches 237 can be located, for example, on Alice's chip, on Bob's chip, or on a third chip. After switched with switch 237a and transmission through one of the transmission paths, active switch 237b can switch the transmission paths for transmission to Bob 120. Upon arrival, the first 2×2 switch 227a can randomly select a transmission path, one corresponding to a path with dispersion, and one corresponding to a path without. The second optical switch 227b can switch the selected transmission path to the single photon detector 225. If both switch 237a and 227a select the transmission path corresponding to dispersion or no dispersion, Alice's direct measurement will be correlated with Bob's measurement. However, if switch 237a and 227a select different transmission paths, the measurements will not be correlated. In this manner, the secret key can be generated as described herein above with only one single photon detector at each party, using a prepare and measure technique where Alice 110 always measures without dispersion for measurements where Bob 120 measures in the basis corresponding to the basis selected by switches 237 prior to transmission.

Figure 3B:
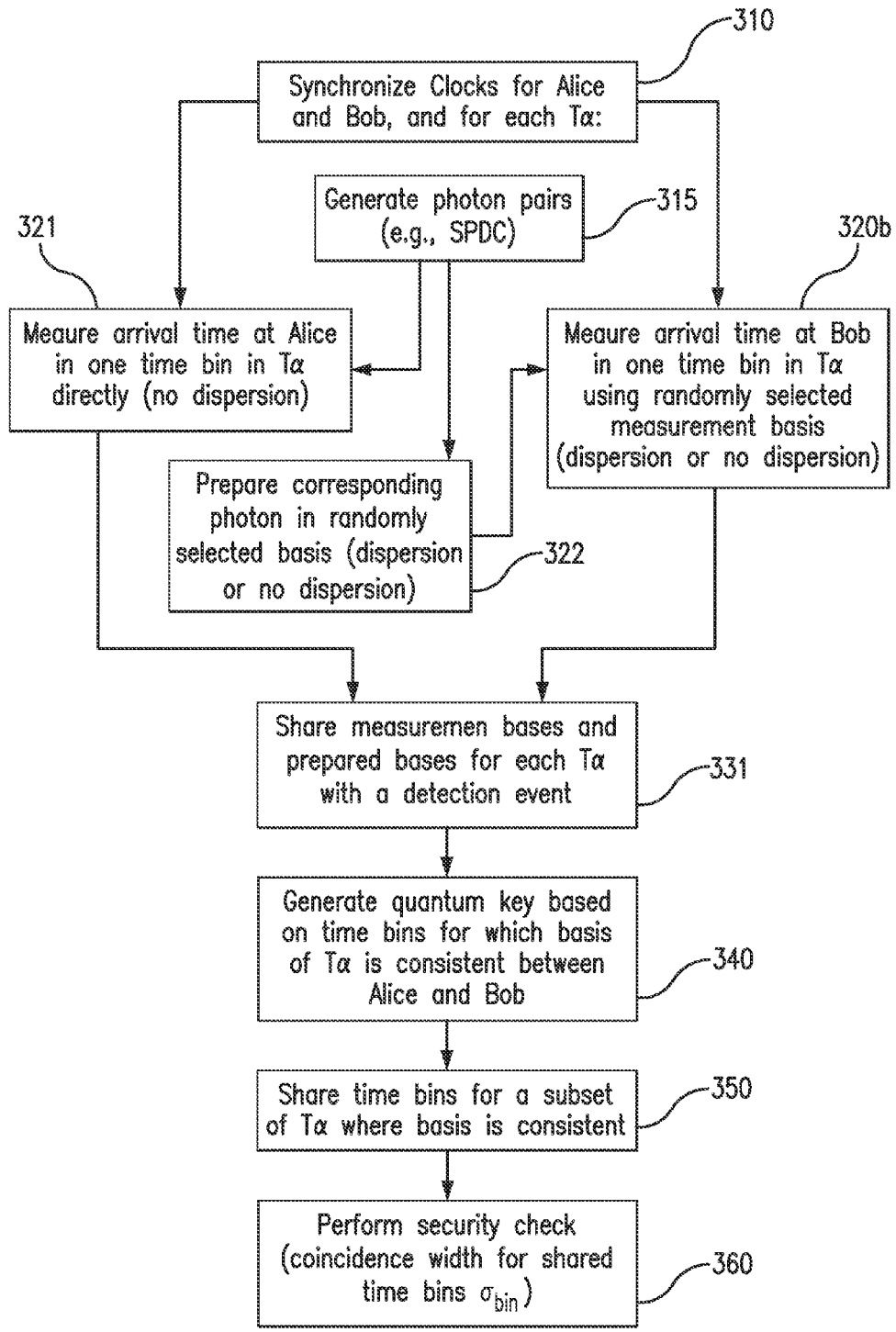
FIG. 3B is a flow diagram of a method for temporal quantum key distribution in accordance with another exemplary embodiment of the disclosed subject matter.

FIG. 3B depicts a method in accordance with an exemplary embodiment of the disclosed subject matter. Alice 110 and Bob 120 can synchronize (310) their clocks, as described herein, so as to define a number of time frames, Tα. A photon pair source, such as a SPDC, can generate photon pairs (315), and one photon of each photon pair can be directed to Alice, and the other photon of each photon pair can be directed to Bob. The SPDC can be associated with, for example Alice. Alice can measure (321) the arrival time of a photon from the SPDC directly (e.g., in a basis without dispersion). The corresponding photon can then be prepared (322) in a randomly selected basis (e.g., with normal dispersion or without) and transmitted to Bob. Bob can measure (320*b*) the arrival time of this photon in a randomly selected basis (e.g., with anomalous dispersion or without). Alice and bob can share (331) the randomly selected bases for each time frame, for example, via the classical communication channel. That is, for example, Alice can share the basis into which the corresponding photon was prepared prior to transmission to Bob, and Bob can share the measurement basis in which the corresponding photon was measured. A quantum key can be generated (340) based on the time bins corresponding to the arrival time of photons within each time frame for which the randomly selected basis is consistent (e.g., where the corresponding photon was prepared in a basis with normal dispersion and Bob measures in a basis corresponding to anomalous dispersion, and where the corresponding photon was prepared in a basis without dispersion and Bob measures in a basis corresponding to no dispersion.). A security check can be performed by sharing (350) the measured time bins for a subset of the time frames for which the basis is consistent, and determining an error metric (360) (e.g., coincidence width) for the shared time bins, to thereby detect the presence of an eavesdropper.

In another exemplary embodiment, with reference to FIG. 2C, techniques for temporal key distribution can include a prepare and measure technique where Alice directly measures the arrival time of her photon, and sends this time to Bob as a synchronization pulse, and then modulates the delay on Bob's photon to encode information. In this exemplary embodiment, one photon of a photon pair generated by photon pair generator 105 can be detected directly by Alice 110 at detector 215. The other photon of the photon pair can be randomly switched with active switches 237*a* and 237*b* (collectively, 237). The switches 237 can randomly switch the transmission path and actively record which transmission path was selected. After switched with switch 237*a* and transmission through one of the transmission paths, active switch 237*b* can switch the transmission paths to Gaussian modulator 250 for transmission to Bob 120. The Gaussian modulator can be composed of a variable delay driven by a Gaussian-distributed random number generator. Alice 110 can record the variable delay. Thus, Alice's detection event at detector 215 can herald the existence of the photon sent to the Gaussian-modulator, at which time Alice can send the synchronization pulse.

Upon arrival at Bob 120, the first 2×2 switch 227*a* can randomly select a transmission path, one corresponding to a path with dispersion, and one corresponding to a path without. The second optical switch 227*b* can switch the selected transmission path to the single photon detector 225. If both switch 237*a* and 227*a* select the transmission path corresponding to dispersion or no dispersion, Bob's measurement will be correlated with Alice's recorded variable delay relative to the synchronization pulse. However, if switch 237*a* and 227*a* select different transmission paths, Bob's measurement will not be correlated with the variable delay. In this manner, the secret key can be generated as described herein above with only one single photon detector at each party, using a prepare and measure technique using a modulation technique and a series of variable delays to encode information. This technique can allow Alice to increase the photon generation rate. With high system detection efficiency, Alice can determine whether multiple pairs are emitted in each frame and can remove them with an amplitude modulator. Therefore, this heralding and postselection technique can allow Alice to send approximately one photon per frame, which the probability of producing multiple photons can be suppressed.

Figure 6:
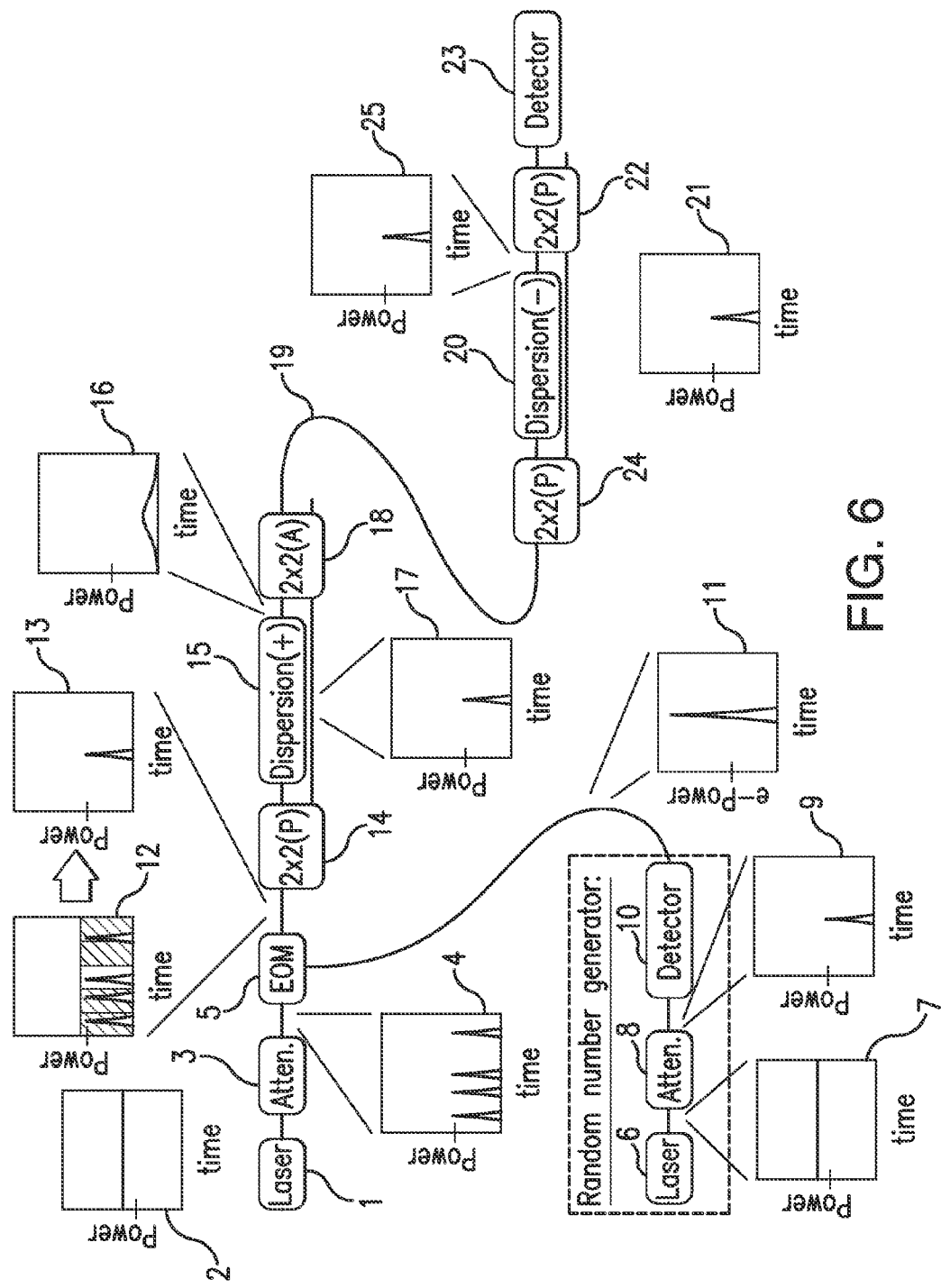
FIG. 6 is a schematic diagram of a system for temporal quantum key distribution in accordance with another exemplary embodiment of the disclosed subject matter.

In another exemplary embodiment, with reference to FIG. 6, techniques for temporal key distribution can include the use of photons generated by a conventional laser for use in certain communications links. A continuous wave laser 1 (which can be, for example, a conventional continuous wave laser used in the telecom industry) can emit photons in the telecommunications band (i.e., having a wavelength of approximately 1300 nm or approximately 1550 nm) at a predetermined power 2. This signal can be strongly attenuated by an attenuator 3 (which can be, for example, a conventional attenuator used in the telecom industry) such that single photons are transmitted with average separation in time (i.e., between the photons). The average separate in time can be, for example, approximately 100 ps. These photons can occur at random times 4.

The sender (e.g., Alice) can use an electro-optic modulator (EOM) 5 (which can be, for example, a conventional EOM) to select when the channel is open 12 such that only photons present when the channel is open 13 can be transmitted. This selection can be random but known to the sender, and can be achieved, for example, by a quantum random number generator, as described herein. The sequence of opening times can correspond to the information which the sender would like to share with the receiver. That is for example, the sequences of opening times can be analogous to the protocol described herein, in which the sender and receiver can share timing information by the detection of, e.g., energy-time entangled photons. The sender and receiver can publicly agree on a bin duration (e.g., the duration for which the EOM opens the channel) and the alphabet length —the number of bins used to encode a single character of the encryption key, and the number of bins within each time frame.

The photons from the modulator 13 can enter a passive 2×2 splitter/beam splitter/directional coupler 14 (which can be, for example, a conventional passive beam splitter used in the telecom industry), such that the photons are equally likely to exit in either the top or bottom path. If the photons exit through the top path, the photons are directed through a normal dispersive element 15 (which can be, for example, a conventional dispersive element used in the telecom industry) which can spread out the photons in time 16. If the photons exit through the bottom path, they are not directed to a dispersive element and are left as short (single-photon) pulses 17. An active 2×2 switch 18 (which can be, for example, a conventional active switch used in the telecom industry) can then select whether the top or bottom path is connected to the communication channel 19 shared with the receiver.

The receiver can use a passive coupler/beam splitter 24 to either apply anomalous dispersion 20 (which can be, for example, a conventional anomalous dispersion element used in the telecom industry) or no dispersion. The receiver can detect photons definitively correlated to the opening time of the sender's EOM 5 if both sender and receiver apply dispersion (16, 25) or both do not apply dispersion (17, 21). If one applies dispersion and the other does not, then correlations can fail to be observed (not shown). Security can be enhanced in this way, as described herein. For example, a security check can be performed to detect the presence of an eavesdropper. The receiver can then use an active switch 22 to choose which path (e.g., bottom or top) is connected to his single photon detector 23.

The random number generator can include, for example, a second continuous wave laser 6, which can be attenuated in an attenuator 8 and detected using an avalanche photodiode 10. The photons, or more generally, detectable signals 9, can be separated in time by a time on the order of d*100 ps, where d is alphabet length. The electrical (classical) signal from this detector 11, corresponding to the detection of single photons or groups of photons, can be amplified and used to drive the EOM 5; the EOM can open when a photon (or group) has struck 10. The EOM can therefore be opened at random times known to the sender.

In certain embodiments, loss in the transmitter can be accounted for as follows. The sender, when calibrating the sender's setup, can measure how much loss is introduced by each element. The sender can therefore increase the laser 1 power and/or decrease the attenuation 3 in the setup such that on the output of the setup, the same number of photons as in the lossless case can be transmitted over the channel.

As disclosed herein, a quantum key distribution protocol can utilize an dispersive optics as a mutually unified base and time-resolving single-photon detectors for secure distribution of a quantum key. In certain exemplary embodiments, larger bandwidths for key distribution can be achieved through implementation of dense wavelength division multiplexed quantum key distribution (DWDM-QKD) to exploit additional frequency correlations to increase the information content per photon or to increase the bit rate.

Figure 7:
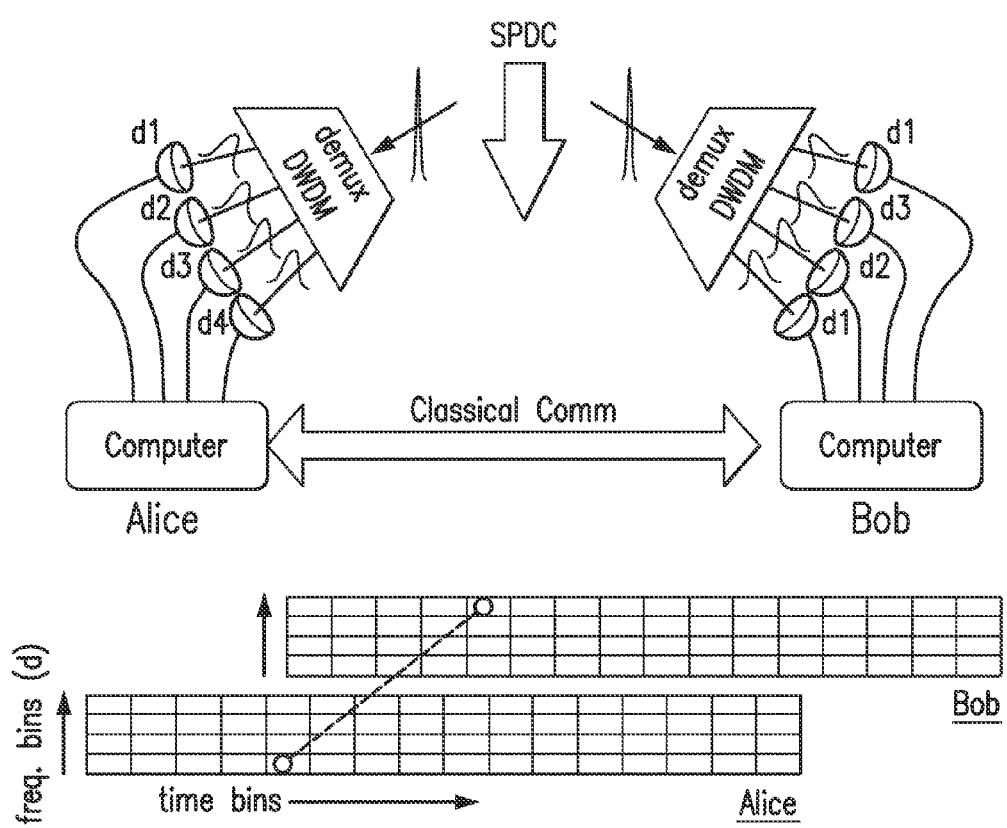
FIG. 7 is a diagram of techniques for quantum key distribution using dense wavelength division multiplexing and dispersive optics in accordance with another exemplary embodiment in accordance with the disclosed subject matter.

FIG. 7 illustrates an exemplary embodiment in which a dense wavelength division de-multiplexing (DWDM) element can be placed in front of two or more detectors to obtain spectral information of detected photons in addition to temporal information as disclosed herein. For purpose of illustration, and not limitation, DWDM networks can break up channels by bandwidth into multiple independent channels defined by carrier signals separated in frequency, e.g., by either 50 GHz or 25 GHz. By contrast, WDM networks can use channel spacings of 100 GHz or 200 Ghz. A DWDM demultiplexing element can separate a single-spatial-mode input signal (e.g., a signal in a single optical fiber or single waveguide) into multiple output spatial modes (e.g., different optical fibers or different waveguides) where each mode corresponds to a DWDM channel, such that photons in each mode have frequencies within the DWDM channel bandwidth of one of the 50-GHz-spaced channels. That is, for example, each time bin can additionally include a number of frequency bins corresponding to the DWDM de-multiplexing elements. In this manner, the number of bits transmitted with each photon can be increased, and can scale with the number of DWDM de-multiplexing elements used. Moreover, the conjugate nature of the temporal and spectral entanglement of photon pairs generated by spontaneous parametric down conversion can provide for the combination of spectral and temporal bases, which can be adjusted for efficient use of resources.

The presently disclosed subject matter is not to be limited in scope by the specific embodiments herein. Indeed, various modifications of the disclosed subject matter in addition to those described herein will become apparent to those skilled in the art from the foregoing description and the accompanying figures. Such modifications are intended to fall within the scope of the appended claims.

The invention claimed is:

1. A method for temporal quantum key distribution between at least a first entity and a second entity with a set of time frames, each time frame including a plurality of time bins, comprising:
    measuring an arrival time of each of a plurality of photons within each of the time frames, the arrival time corresponding to one of the plurality of time bins within the time frame, wherein measuring includes measuring in a randomly selected one of at least two mutually unbiased bases, and wherein the at least two mutually unbiased bases include a basis corresponding to a measurement with dispersion and a basis corresponding to a measurement without dispersion;
    communicating, via a classical communications channel, the randomly selected basis for each of the time frames within the set of time frames; and
    generating a quantum key from each of the plurality of time bins, corresponding to the arrival time of each of the plurality of photons, within at least some of the time frames for which the randomly selected basis is consistent between the first and the second entity.

2. The method of claim 1, further comprising performing a security check on a subset of the time frames for which the randomly selected basis is consistent between the first and the second entity.

3. The method of claim 2, wherein the performing a security check further comprises:
    communicating, via the classical communications channel, the time bins corresponding to the arrival times of photons within each of the subset of time frames;
    generating an error metric from a comparison of the time bins for each of the subset of time frames.

4. The method of claim 1, wherein the measuring the arrival time further includes routing a photon through a transmission path having dispersive optics when the first randomly selected one of the at least two mutually unbiased bases is the basis corresponding to a measurement with dispersion, and wherein measuring the arrival time includes routing a photon through a transmission path free of dispersive optics when the first randomly selected one of the at least two mutually unbiased bases is the basis corresponding to a measurement without dispersion.

5. The method of claim 1, further comprising:
    generating pairs of first and second photons, and wherein measuring an arrival time further comprises for each photon pair:
        measuring, in a first randomly selected one of the at least two mutually unbiased bases, an arrival time of the first photon at the first entity;
        measuring, in a second randomly selected one the at least two mutually unbiased bases, an arrival time of the second photon at the second entity; and
    wherein the generating the quantum key further comprises generating a quantum key from each of the plurality of time bins, corresponding to the arrival time of each photon pair, within at least some of the time frames for which the first randomly selected basis corresponds to the second randomly selected basis.

6. The method of claim 5, wherein the basis corresponding to a measurement with dispersion at the first entity includes measurement with normal dispersion, and wherein the basis corresponding to a measurement with dispersion at the second entity includes measurement with anomalous dispersion.

7. The method of claim 1, further comprising:
generating pairs of first and second photons at the first entity, and wherein the measuring an arrival time further comprises for each photon pair:
  measuring, in the basis corresponding to a measurement without dispersion, an arrival time of the first photon at the first entity;
  preparing, at the first entity, the second photon in a first randomly selected one of the at least two mutually unbiased bases;
  recording, at the first entity, the first randomly selected one of the at least two mutually unbiased bases;
  transmitting the second photon to the second entity;
  measuring, in a second randomly selected one the at least two mutually unbiased bases, an arrival time of the second photon at the second entity; and
wherein the generating the quantum key further comprises generating a quantum key from each of the plurality of time bins, corresponding to the arrival time of each photon pair, within at least some of the time frames for which the first randomly selected basis corresponds to the second randomly selected basis.

8. The method of claim 7, wherein the preparing the second photon in a first randomly selected one of the at least two mutually unbiased bases includes preparing the second photon in a basis corresponding to normal dispersion, and wherein the basis corresponding to a measurement with dispersion at the second entity includes measurement with anomalous dispersion.

9. The method of claim 7, further comprising routing the second photon through a variable delay driven by a random number generator prior to transmitting the second photon to the second entity, and recording a delay generated by the variable delay.

10. The method of claim 1, further comprising generating a stream of single photons for transmission through an optical fiber from the first entity to the second entity, further comprising, at the first entity:
  randomly modulating transmission of the stream of single photons through the optical fiber over time to generate a random transmission pattern;
  randomly preparing photons in the stream of single photons in one of the least two mutually unified bases; and
  wherein the measuring further comprises, at the second entity: detecting an arrival time of photons in the stream of single photons in a randomly selected one of the two mutually unified bases, and wherein generating the quantum key further includes generating a quantum key from the random transmission pattern and the detected arrival time of photons in the stream of single photons detected in a corresponding mutually unified basis as randomly applied to the stream of single photons.

11. A system for temporal quantum key distribution between a first entity and a second entity, comprising:
  a receiver including at least one single photon detector adapted to receive a plurality of photons, the receiver configured to measure an arrival time of each photon within each of a set of time frames, the arrival time corresponding to one of a plurality of time bins within each time frame;
  an optical element to randomly direct each photon to the at least one single photon detector through a first optical path with dispersive optics, corresponding to a first of at least two mutually unbiased bases, or a second optical path without dispersive optics, corresponding to a second of the at least two mutually unbiased bases, thereby randomly selecting one of the at least two mutually unbiased bases;
  a classical communication channel, for communicating the randomly selected basis for each of the time frames within the set of time frames; and
  one or more processors, coupled with the receiver and coupled with the classical communication channel and configured to generate a quantum key from each of the plurality of time bins, corresponding to the arrival time of each of the plurality of photons, within at least some of the time frames for which the randomly selected basis is consistent between the first and the second entity.

12. The system of claim 11, wherein the one or more processors is further configured to perform a security check on a subset of the time frames for which the randomly selected basis is consistent between the first and the second entity.

13. The system of claim 12, wherein the one or more processors is further configured to communicate, via the classical communications channel, the time bins corresponding to the arrival times of photons within each of the subset of frames, and generate an error metric from a comparison of the time bins for each of the subset of frames.

14. The system of claim 11, wherein the at least one single photon detector includes one single photon detector, and wherein the optical element includes two-by-two optical switches adapted to randomly switch between the first optical path and the second optical path.

15. The system of claim 11, wherein the at least one single photon detector includes a first single photon detector coupled with the first optical path and a second single photon detector coupled with the second optical path, and wherein the optical element includes a beam splitter adapted to randomly direct photons to the first optical path or the second optical path.

16. The system of claim 11, wherein the receiver, the optical element, and at least one of the one or more processors are associated with the first entity, further comprising:
  a second receiver, associated with the second entity, including at least one single photon detector adapted to receive a second plurality of photons, the second receiver configured to measure an arrival time of each photon within each of the set of time frames, the arrival time corresponding to one of a plurality of time bins within each time frame;
  a second optical element, associated with the second entity, to randomly direct each photon to the at least one single photon detector through a first optical path with dispersive optics corresponding to a first of at least two mutually unbiased bases, or a second optical path without dispersive optics corresponding to a second of the at least two mutually unbiased bases, thereby randomly selecting one of the at least two mutually unbiased bases; and
  at least a second processor, associated with the second entity, coupled with the second receiver and coupled with the classical communication channel.

17. The system of claim 16, further comprising a photon pair source for generating pairs of photons, the photon pair source configured to transmit one photon of each photon pair to each of the first entity and the second entity.

18. The system of claim 17, wherein the at least one processor associated with the first entity and the second processor associated with the second entity are configured to generate a quantum key from each of the plurality of time bins, corresponding to the arrival time of the respective one photon of each photon pair, within at least some of the time frames for which the randomly selected basis is consistent between the first and the second entity.

19. The system of claim 16, wherein the first optical path for the first entity includes dispersive optics adapted to impart normal dispersion, and wherein the first optical path for the second entity includes dispersive optics adapted to impart anomalous dispersion.

20. The system of claim 11, wherein the receiver, the optical element, and at least one of the one or more processors are associated with the first entity, further comprising:
a second receiver, associated with the second entity, including at least one single photon detector adapted to receive a second plurality of photons, the second receiver configured to measure an arrival time of each photon within each of the set of time frames, the arrival time corresponding to one of a plurality of time bins within each time frame;
a photon pair source, associated with the second entity, for generating pairs of photons, the photon pair source configured to transmit a first photon of each photon pair to the second receiver and a second photon of each photon pair;
a second optical element, adapted to receive the second photon of each photon pair, and configured to randomly direct the second photon of each photon pair to a receiver associated with the first party through a first optical path with dispersive optics corresponding to a first of at least two mutually unbiased bases, or a second optical path without dispersive optics corresponding to a second of the at least two mutually unbiased bases, thereby randomly selecting one of the at least two mutually unbiased bases; and
at least a second processor, associated with the second entity, coupled with the second receiver, the second optical element, and the classical communication channel, wherein the second processor is configured to record the randomly selected basis resulting from randomly directing the second photon of each photon pair through the first optical path or the second optical path.

21. The system of claim 20, wherein the at least one processor associated with the first entity and the second processor associated with the second entity are configured to generate a quantum key from each of the plurality of time bins, corresponding to the arrival time of the first photon the second photon of each photon pair, respectively, within at least some of the time frames for which the recorded randomly selected basis of the second entity is consistent with the randomly selected basis of the first entity.

22. The system of claim 20, wherein the first optical path for the first entity includes dispersive optics adapted to impart normal dispersion, and wherein the first optical path for the second entity includes dispersive optics adapted to impart anomalous dispersion.

23. The system of claim 11, wherein the receiver, the optical element, and at least one of the one or more processors are associated with the first entity, further comprising further comprising:
a continuous wave laser configured to emit photons through an optical fiber transmission channel, the optical fiber coupled with the first entity;
an attenuator, coupled with the continuous wave laser and adapted to attenuate the emitted photons such that single photons are transmitted with a predetermined average separation time;
an electro-optic modulator, associated with the second entity, configured to randomly select when the optical fiber transmission channel is in an open state or a closed state, wherein only photons present when the channel is open are transmitted;
a second optical element, adapted to receive the transmitted photons, and configured to randomly direct each of the transmitted photons to receiver associated with the first party through a first optical path with dispersive optics, corresponding to a first of at least two mutually unbiased bases, or a second optical path without dispersive optics, corresponding to a second of the at least two mutually unbiased bases, thereby randomly selecting one of the at least two mutually unbiased bases; and
at least a second processor, associated with the second entity, coupled with the electro-optic modulator and the second optical element, wherein the second processor is configured to record the state of the transmission channel and record the randomly selected basis resulting from randomly directing each of the transmitted photons through the first optical path or the second optical path.

24. The system of claim 23, wherein the at least one processor associated with the first entity and the second processor associated with the second entity are configured to generate a quantum key from each of the plurality of time bins, corresponding to the arrival time of transmitted photons within at least some of the time frames for which the recorded randomly selected basis of the second entity is consistent with the randomly selected basis of the first entity.

* * * * *